US012021336B1

(12) United States Patent
Siddiqui

(10) Patent No.: US 12,021,336 B1
(45) Date of Patent: Jun. 25, 2024

(54) TRACK ELECTRIC DISTRIBUTION SYSTEM

(71) Applicant: Irfan Ullah Siddiqui, Apex, NC (US)

(72) Inventor: Irfan Ullah Siddiqui, Apex, NC (US)

( * ) Notice: Subject to any disclaimer, the term of this patent is extended or adjusted under 35 U.S.C. 154(b) by 0 days.

(21) Appl. No.: 18/162,072

(22) Filed: Jan. 31, 2023

(51) Int. Cl.
*H01R 25/14* (2006.01)

(52) U.S. Cl.
CPC ......... *H01R 25/142* (2013.01); *H01R 25/145* (2013.01)

(58) Field of Classification Search
CPC ................ H01R 25/142; H01R 25/145; H01R 25/00–25/168
See application file for complete search history.

(56) References Cited

U.S. PATENT DOCUMENTS 1,763,495 A * 6/1930 Young ..................... F21V 21/35 191/23 R
2,924,804 A 2/1960 Frank et al.
3,603,918 A * 9/1971 Woertz ................. H01R 25/142 439/94
3,680,030 A * 7/1972 Johnson .................. F21V 21/35 191/23 A
4,190,309 A * 2/1980 Glass ................... H01R 25/142 439/118
4,968,262 A * 11/1990 Widell ................. H01R 25/142 439/121
5,522,704 A * 6/1996 Casteel ................ H01R 25/142 416/246
9,673,582 B2 * 6/2017 Guilmette .............. H01R 25/14

FOREIGN PATENT DOCUMENTS

DE 10307353 B4 * 2/2008 ............. H01R 25/14

* cited by examiner

*Primary Examiner* — Travis S Chambers
(74) *Attorney, Agent, or Firm* — Ashley D. Johnson; Dogwood Patent and Trademark Law

(57) ABSTRACT

A track electrical distribution system that allows many devices to be attached, but can also be used to attach non-electrical devices, with the ability to make waterproof is a major function of the device.

15 Claims, 4 Drawing Sheets

TRACK ELECTRIC DISTRIBUTION SYSTEM

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a track electrical distribution system. In particular, it relates to an electric rail system with infinite connection points and the ability to mount equipment including non-electric equipment, which can be made waterproof, water resistant, or non-waterproof.

Description of Related Art

There are a wide variety of extension cords and electrical tracks such as track lighting. These all serve similar functions providing AC (alternating current) or DC (direct current) electricity to one or more electrical devices. The major problem with these devices is they have limited space to attach an electrical device. Track lighting provides infinite mounting points as the wires are bare along the length of the track, but they are not designed for attaching anything that is not driven by electricity, and they require extensive wiring. Additionally, they also have difficulty with water resistance.

BRIEF SUMMARY OF THE INVENTION

The present invention relates to a track electrical distribution system which allows many devices to be attached and can also be used to attach non-electrical devices. It also includes novel ways for an electrical device to attach to the new track electrical conductors, i.e., novel plugs. In one embodiment, the present invention allows for multiple connection points for AC/DC devices. These capabilities provide great benefits and can save energy on a larger scale. Additional advantages include a decrease in storage space and the ability to become waterproof by use of a cap to cover the slots when not in use. Connections for electronic devices can be waterproof.

Accordingly, in one embodiment, there is a device for attaching both electrical and non-electrical devices comprising:

a) an elongated C-shaped housing of a given length, the open part of the C-shaped housing facing upward or downward;

b) a conductor housing in the elongated C-shaped housing running the length of the housing; and c) a pair of uninsulated conductors inside the conductor housing running about the length of the housing, wherein a bottom of each pair of uninsulated conductors is exposed through holes in a bottom of the conductor housing, and wherein a pressure-fit plug can hold plug wires in place against the pair of conductors.

In another embodiment, there is an electrical plug designed for the attachment to the device comprising:

a) an outer plug housing; and b) an inner plug housing having a pair of electrical wires, wherein the inner plug housing is tension loaded to push the wires against the conductors and hold the plug in or on a C-shaped housing.

DETAILED DESCRIPTION OF THE INVENTION

Figure 1:
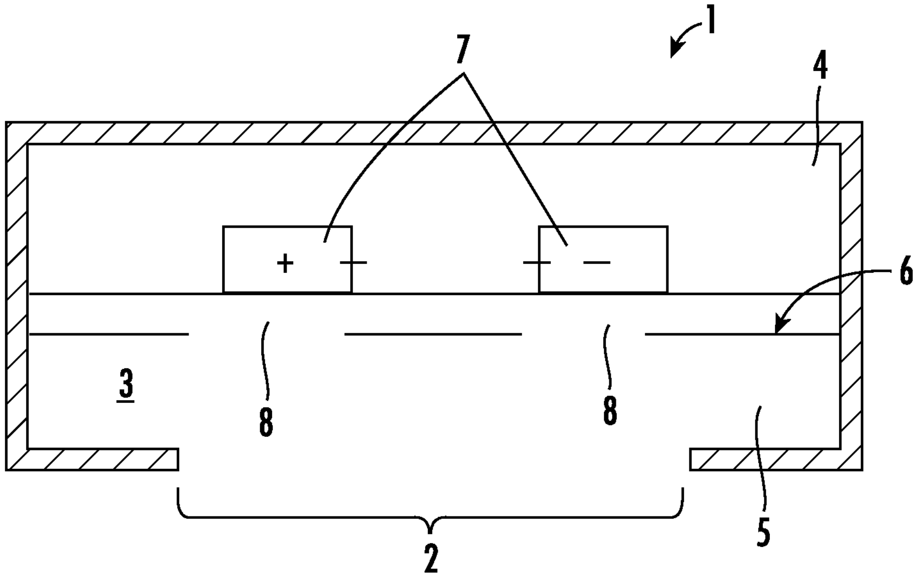
FIG. 1 is a cross section view of the power strip of the present invention.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms “about” and “essentially” mean±10 percent.

The terms “a” or “an”, as used herein, are defined as one or as more than one. The term “plurality”, as used herein, is defined as two or as more than two. The term “another”, as used herein, is defined as at least a second or more. The terms “including” and/or “having”, as used herein, are defined as comprising (i.e., open language). The term “coupled”, as used herein, is defined as connected, although not necessarily directly, and not necessarily mechanically.

The term “comprising” is not intended to limit inventions to only claiming the present invention with such comprising language. Any invention using the term comprising could be separated into one or more claims using “consisting” or “consisting of” claim language and is so intended.

Reference throughout this document to “one embodiment”, “certain embodiments”, “an embodiment”, or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein, the term "attaching electrical devices" refers to being able to attach electrical devices to the power strip of the present invention, which run on electrical current as a power source, using either AC or DC. In the prior art, plugs for attachment to a power strip utilize the standard 2 prong plug. Other prior art attachments are, for example, round plugs designed by shape for various voltages, usually DC voltages. The present invention is a novel power strip, which requires novel plug designs to attach an electrical device for powering the electrical device.

As used herein, the term "power strip" refers to a block of electrical sockets that attaches to the end of a flexible cable allowing multiple electrical devices to be powered from a single electrical socket. In the present invention, the power strip can have no sockets except the one it attaches to, so that the electrical devices can attach anywhere along the length of the conductor and not just at identified sockets as is taught in the prior art. The present invention allows for either AC and DC power, or both. In one embodiment, it provides multiple connection points for AC and DC devices.

Figure 2:
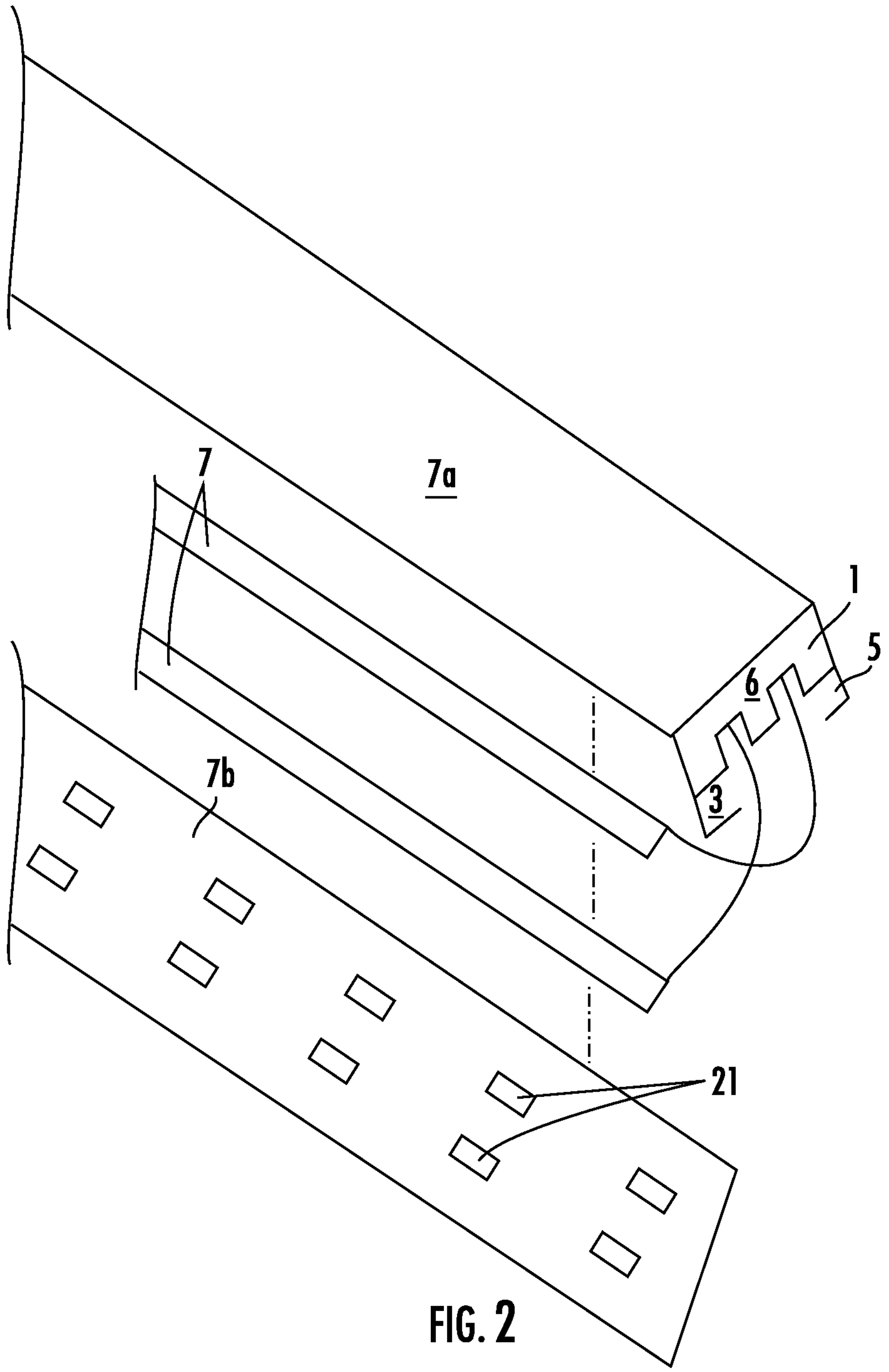
FIG. 2 is an exploded view of the power strip of the present invention.
Figure 6:
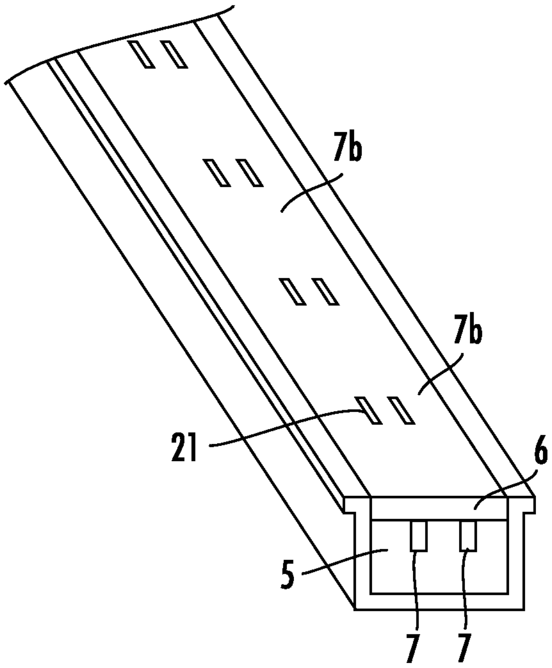
FIG. 6 is a perspective view with an optional cover of the present invention.

As used herein, the term "elongated C-shaped housing" refers to a power strip housing track, rail, and the like that is open on one side as shown in the embodiment in FIG. 2 and FIG. 6, which is in a general C-shape with the open part of the C-shape facing upward or downward. The housing can be any desired length and deciding the length is one of desired use, not due to any physical limitations. In general, in one embodiment, its length is based on use so both short and long of a given length are contemplated. In one embodiment, the power strip housing has straight sides. The housing is, in general, made of metal, plastic, and the like suitable for use with electrical devices, but any compatible materials could be utilized.

As used herein, the term "given length" refers to the length of the housing decided by the manufacturer of the power strip based on intended use.

As used herein, the term "open part of the C-shaped housing" refers to the part of the C-shaped opening facing upward or downward as shown in the Figures. The area inside the open part of the C-shaped housing has a top area and a bottom area with the top area designed to house the conductor housing.

As used herein, the term "conductor housing" refers to an elongated housing area inside the C-shaped housing designed to contain two or more conductor wires (AC or DC, or a combination) that can be connected to a power source (e.g., electrical outlet). The housing is positioned in the upper open area of the C-shaped housing as shown in the Figures. The conductor housing has holes, slots, or openings beneath the conductors to allow the novel plug style of the present invention to attach. In one embodiment, the hole is continuous, and in another embodiment, the holes are spaced apart. The housing will, in general, be about the same length as the C-shaped house, as will the conductors. It can be made of any material with insulator inserts (i.e., metal, plastic, and the like), which carry the conductors. In another embodiment, it can be made from a single piece, which acts as an insulator with conductor inserts.

As used herein, the term "uninsulated conductors" refers to bare wires which run the length of the conductor housing. These wires are plugged into or connected to an electrical power source, such as a socket, or the like.

As used herein, the term "pressure-fit plug" refers to a plug where the wires of the plug attach to the power strip conductors by pressure or the tension exerted by a spring, threading (threaded cam), cam, and the like. One embodiment of the pressure plug is shown in the Figures and described herein.

As used herein, the term "plug wires" refers to the electrical conducting of the electrical device to be attached to the power strip of the present invention.

As used herein, the term "outer plug housing" refers to a rigid outer shell designed to insulate a user from the conductors within.

As used herein, the term "inner plug housing" refers to a housing positioned inside the outer plug housing, which carries the two conductor wires of the device to be powered. The inner plug housing also may have a tension device, like a spring and the like to hold the plug wires against the conductor wires and hold the plug in the C-shaped channel.

As used herein, the term "tension-loaded" refers to being spring-loaded, or threaded, and the like. It is noted that any lip shown as a straight edge can be tapered as needed. In another embodiment, the device is waterproof such as by using O-rings.

DRAWINGS

Now referring to the drawings, FIG. 1 is a cross section view of the power strip of the present invention. In this view, C-shaped housing 1 has open bottom 2 with the sides being straight. The C-shaped housing 1 defines an open space 3 having a top area 4 and bottom area 5. Positioned with the top area 4 is a conductor housing 6 having two conductors 7 positioned along the length of the conductor housing 6. Beneath the two conductors 7, the conductor housing 6 has opening 8 to allow connection of the novel plug of the invention. While spaced apart openings are shown in FIG. 2, it could also be a continuous slot under each of the two conductors 7.

FIG. 2 is an exploded view of the power strip of the present invention. In this view, the C-shaped housing 1 has top 7*a* part of conductor housing 6 positioned along its length with individual openings 21 which can be customized as needed on optional bottom 7*b*.

Figure 3:
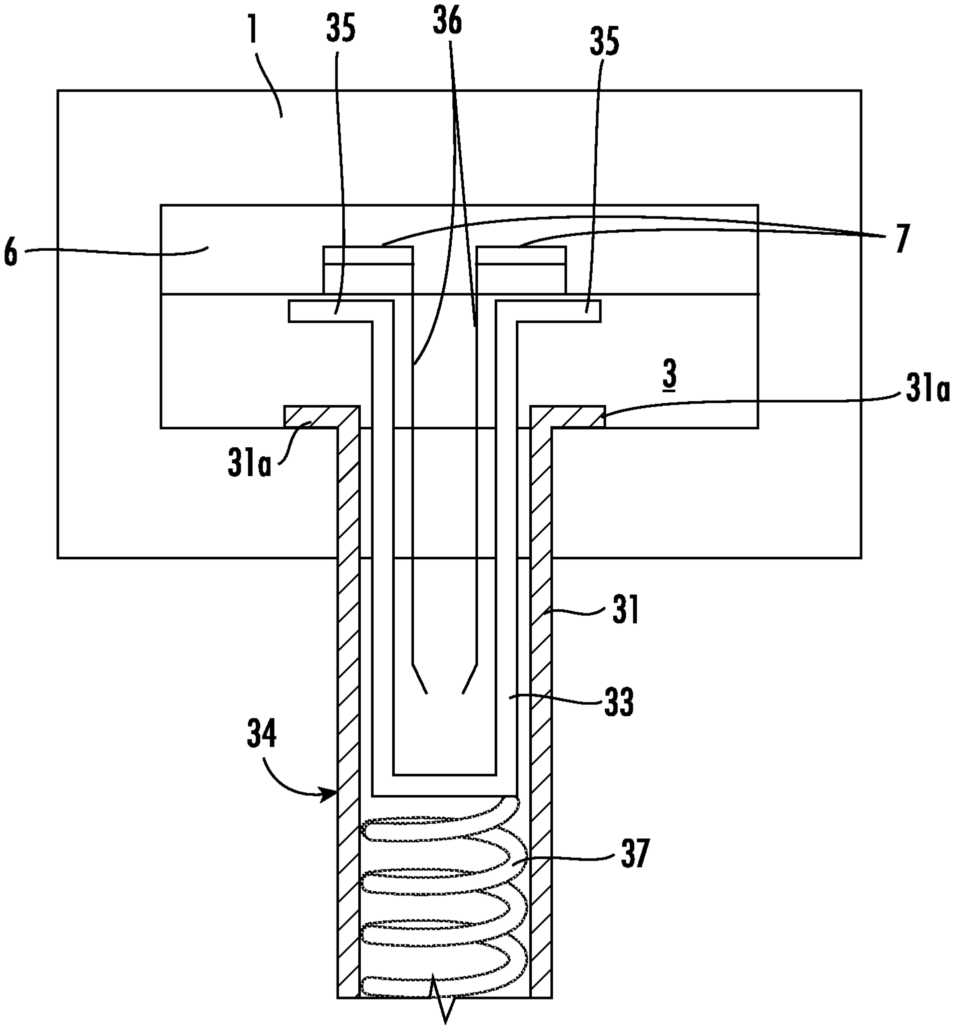
FIG. 3 is a cross section view of the power strip with a cut away of a novel plug of the present invention.

FIG. 3 is a cross section view of an embodiment of the track with a novel plug of the present invention. In this view, outer plug housing 31 has lips 31*a* which hang on the lower portion of the C-shaped housing 1. Inner plug housing 33 is positioned in a sliding manner inside of outer plug housing 31. A spring 37 inside the outer plug housing 31 and the bottom of the inner plug housing 33, biases the inner plug housing 33 upwards where inner housing lips 35 press against the bottom of the conductor housing 6 holding the plug 34 in place in the C-shaped inner space 3. Wires 36 inside the inner conductive housing are forced upward and connect the plug wires by pressing them against the conductors 7.

Figure 4:
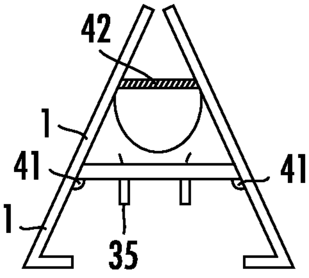
FIG. 4 is a perspective view of an embodiment of the plug of the present invention.

FIG. 4 is a perspective view of an embodiment of the plug. In this view, housing 1 has spring 42 for opening or closing due to hinges 41 so that it acts like a clip-on plug.

Figure 5:
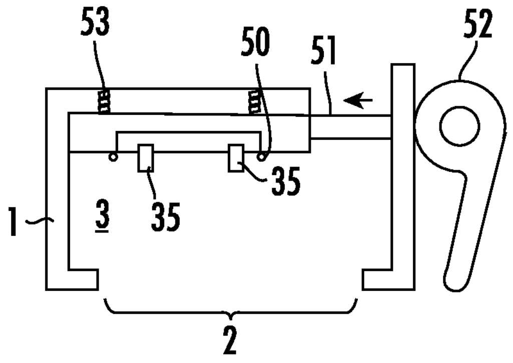
FIG. 5 is a perspective view of an alternative embodiment of the plug of the present invention.

FIG. 5 is a perspective view of another embodiment of the plug of the present invention, in this view, the plug has a C-shaped body. Further in this view, adjustable shaft 51 which can be smooth, threaded, a cam, and the like allows attachment to rail. Cam lock 52 shows one embodiment of how to adjust and lock the adjustable shaft 51 in place. O-ring 50 waterproofs the device. Also shown are mounting screws 53 which allow a device to be attached to the rail.

FIG. 6 a perspective view of showing the present invention with an optional power strip cover **7*b* with built-in slots 21** for plugs.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. An electrical plug comprising:

a. an outer plug housing, wherein the outer plug housing includes one or more pairs of wings for attachment to a C-shaped housing of a device, the device comprising:

1. An elongated C-shaped housing of a given length, with an open part of the C-shaped housing, wherein the C-shaped housing comprises lips that are bent in toward a center of the open part of the C-shaped housing, and wherein the C-shaped housing has a length configured to mount electrical and non-electrical devices without electrical connection at any point;
2. A conductor housing in the elongated C-shaped housing running about the length of the conductor housing, wherein the conductor housing includes one or more holes positioned along a bottom of the conductor housing, and wherein the holes are covered with a waterproofing cap when not connected to a pressure fit plug; and
3. one or more uninsulated conductors inside the conductor housing running about the length of the conductor housing, wherein a bottom of each of the one or more uninsulated conductors is exposed through the holes in the bottom of the conductor housing and wherein the pressure fit plug can hold plug wires of the electrical plug in place against the one or more conductors and wherein electrical connections are made only at fixed points where the holes in the conductor housing are located and wherein the fixed points and C-shaped housing are further configured to mount the electrical devices with an electric connection at the same or different points;

wherein one pair of wings is fixed to an outer plug housing end where an inner plug housing is exposed through, this pair of wings will be pressed against the inner portion of the C-shaped housing lips by tension and wherein a second pair of outer plug housing wings is slidingly or threadedly positioned to press against an outer portion of the C-shaped housing lips by tension and wherein the outer plug housing exterior is smooth or threaded;

b. the inner plug housing having one or more plug conductors, wherein the inner plug housing is tension loaded to push one or more plug conductor wires against the one or more plug conductors and hold the outer plug housing in or on the C-shaped housing.

2. The electrical plug of claim 1, wherein the pressure fit plug and plug wires are held against the pair of uninsulated conductors by a tension attachment.

3. The electrical plug of claim 1, wherein a tension connection to the device for attaching both the electrical and non-electrical devices is a spring, a threaded screw, or a cam.

4. The electrical plug of claim 1, wherein the pressure fit plug and its connection to the device for attaching both electrical and non-electrical devices are waterproof via an O-ring or other waterproofing membrane surrounding the plug conductors.

5. The electrical plug of claim 1, wherein the inner plug housing is slidingly or threadedly positioned inside of the outer plug housing.

6. An electrical plug designed for the attachment to a device for attaching both electrical and non-electrical devices, wherein the electrical plug comprises one or more plug conductors, a plug housing, a spring, screw, or cam positioned between two sides of the plug housing, and a pair of hinges that enable the plug housing sides to open and close to push plug conductor wires against the conductors and to hold the electrical plug in or on the C-shaped housing, and wherein the device for attaching both electrical or non-electrical devices comprise:

a. an elongated C-shaped housing of a given length, the C-shaped housing comprising an open part , wherein the C-shaped housing has lips bent out away from a center of the open part of the C-shaped housing and wherein the length of the C-shaped housing is configured to mount electrical and non-electrical devices without electrical connection at any point; and b. a conductor housing positioned in the elongated C-shaped housing running about the length of the C-shaped housing, wherein the conductor housing includes one or more holes positioned along a bottom of the conductor housing and wherein the holes are covered with a waterproofing cap when not connected with plug; and c. one or more uninsulated conductors positioned inside the conductor housing running about the length of the conductor housing, wherein a bottom of each of the one or more uninsulated conductor is exposed through the holes in the bottom of the conductor housing and wherein the pressure fit plug is configured to hold the plug conductor wires in place against the one or more conductors and wherein electrical connections are made only at fixed points where the holes in the conductor housing are located and wherein the fixed points and C-shaped housing are further configured to mount electronic devices with an electric connection and wherein the length of the C-shaped housing is configured to mount the electrical and non-electrical devices without electrical connection at the same or different points.

7. The electrical plug of claim 6, wherein the pressure fit plug is a clip on plug.

8. The electrical plug of claim 6, wherein the pressure fit plug and its connection to the device for attaching both electrical and non-electrical devices is waterproof via an O-ring or other waterproofing membrane surrounding the plug conductors.

9. The electrical plug designed for the attachment to the device for attaching both the electrical and non-electrical devices in claim 6, wherein the electrical plug comprises a C-shaped body.

10. The electrical plug of claim 9, wherein the C-shaped body has one or more mounting screws positioned on a top face of the C-shaped body.

11. The electrical plug of claim 9, wherein the pressure fit plug and its connection to the device for attaching both electrical and non-electrical devices is waterproof by use of an O-ring or a waterproofing membrane surrounding the plug conductors.

12. The electrical plug of claim 9, wherein the C-shaped body includes one or more shafts that are adjustable in length for attachment to the C-shaped housing.

13. The electrical plug of claim 12, wherein the one or more shafts are positioned on either side or both sides of the C-shaped body.

14. The electrical plug of claim 12, wherein the one or more shafts further comprise a cam lock, threaded screw, or spring that adjusts and locks the adjustable shafts in a position and push the plug conductor wires against the conductors and to hold the electrical plug in or on the C-shaped housing.

15. A device for attaching both electrical and non-electrical devices compromising:

an elongated C-shaped housing of a given length, an open part of the C-shaped housing, wherein the C-shaped housing comprises lips that are bent in toward or out away from a center of the open part of the C-shaped housing, and wherein the length of the C-shaped housing is configured to mount electrical and non-electrical devices without electrical connection at any point;

a conductor housing in the elongated C-shaped housing running about the length of the C-shaped housing, wherein the conductor housing includes one or more holes positioned along a bottom of the conductor housing, and wherein the holes are covered with a waterproofing cap when not connected to the pressure fit plug; and one or more uninsulated conductors inside the conductor housing running about the length of the conductor housing, wherein a bottom of each of the one or more uninsulated conductors is exposed through the holes in the bottom of the conductor housing and wherein the pressure fit plug can hold plug wires in place against the one or more conductors and wherein electrical connections are made only at fixed points where the holes in the conductor housing are located and wherein the fixed points and C-shaped housing are further configured to mount electronic devices with an electric connection at the same or different points.

* * * * *